United States Patent [19]
Szabo et al.

[11] Patent Number: 5,730,481
[45] Date of Patent: *Mar. 24, 1998

[54] QUICK CONNECTOR WITH SNAP-ON RETAINER

[75] Inventors: George Szabo, Ortonville; Thomas E. Grooters, Rochester Hills; Tim M. Dangel, Commerce Township., all of Mich.

[73] Assignee: ITT Automotive, Inc., Auburn Hills, Mich.

[*] Notice: The term of this patent shall not extend beyond the expiration date of Pat. No. 5,542,716.

[21] Appl. No.: 473,729

[22] Filed: Jun. 7, 1995

Related U.S. Application Data

[63] Continuation-in-part of Ser. No. 334,754, Nov. 4, 1994, Pat. No. 5,542,716.

[51] Int. Cl.⁶ .......................................... F16L 37/12
[52] U.S. Cl. .......................... 285/305; 285/319; 285/921
[58] Field of Search ............................ 285/305, 319, 285/921, 23

[56] References Cited

U.S. PATENT DOCUMENTS

| | | |
|---|---|---|
| 2,021,241 | 11/1935 | Mall . |
| 3,245,702 | 4/1966 | Smith . |
| 3,794,057 | 2/1974 | Badger . |
| 4,244,608 | 1/1981 | Stuemky .......................... 285/305 |
| 4,423,892 | 1/1984 | Bartholomew . |
| 4,433,861 | 2/1984 | Kreczik . |
| 4,481,218 | 11/1984 | Paul, Jr. et al. . |
| 4,524,995 | 6/1985 | Bartholomew . |
| 4,526,411 | 7/1985 | Bartholomew . |
| 4,561,692 | 12/1985 | Tisserat .......................... 285/305 |
| 4,591,192 | 5/1986 | Van Exel et al. .......................... 285/305 X |
| 4,869,534 | 9/1989 | Ketcham et al. . |
| 4,874,174 | 10/1989 | Kojima et al. . |
| 4,925,217 | 5/1990 | Ketcham . |
| 4,936,544 | 6/1990 | Bartholomew . |
| 4,946,205 | 8/1990 | Washizo . |
| 4,948,175 | 8/1990 | Bartholomew . |
| 5,016,922 | 5/1991 | Le Mer et al. .......................... 285/305 X |
| 5,102,313 | 4/1992 | Szabo . |
| 5,152,555 | 10/1992 | Szabo . |
| 5,178,424 | 1/1993 | Klinger . |
| 5,211,427 | 5/1993 | Washizu .......................... 285/23 |
| 5,226,679 | 7/1993 | Klinger . |
| 5,275,443 | 1/1994 | Klinger . |
| 5,297,818 | 3/1994 | Klinger . |
| 5,348,353 | 9/1994 | Deweerdt . |
| 5,405,175 | 4/1995 | Bonnah, II et al. . |
| 5,423,577 | 6/1995 | Ketcham . |
| 5,452,924 | 9/1995 | Kujawski . |
| 5,524,716 | 6/1996 | Szabo et al. .......................... 285/305 |

FOREIGN PATENT DOCUMENTS

| | | |
|---|---|---|
| 9315349 | 8/1993 | European Pat. Off. . |
| 2087021 | 5/1992 | United Kingdom . |

*Primary Examiner*—Terry Lee Melius
*Assistant Examiner*—Heather Shackelford
*Attorney, Agent, or Firm*—Thomas N. Twomey; J. Gordon Lewis

[57] ABSTRACT

A retainer for releasably locking the male and female component of a quick connector together. The retainer is releasably insertable into a transverse bore formed in the female component and includes an edge slidable over a radial flange on the male component only when the male component is fully coupled in an axial bore in the female component. The engagement of the edges and the radial flange on the male component permits full insertion of the retainer into the transverse bore in the female component around the male component to lock the male component and female component together. Lock projections on the retainer engage grooves in the housing to releasably lock the retainer in a partially inserted, shipping position in the transverse bore in the female component and engage exterior lock surfaces on the housing on full insertion of the retainer to lock the retainer and the fully inserted male component to the female component.

34 Claims, 9 Drawing Sheets

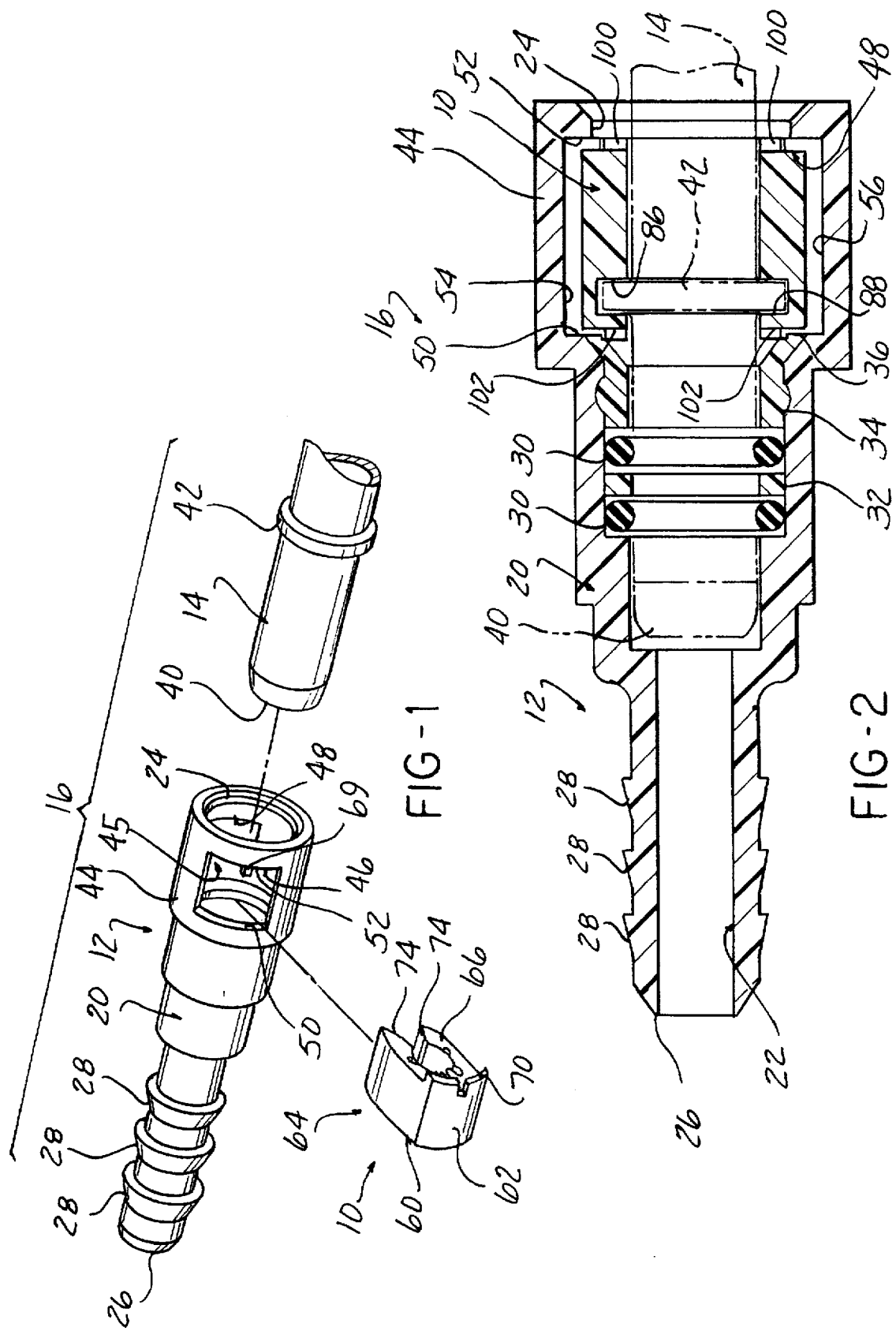

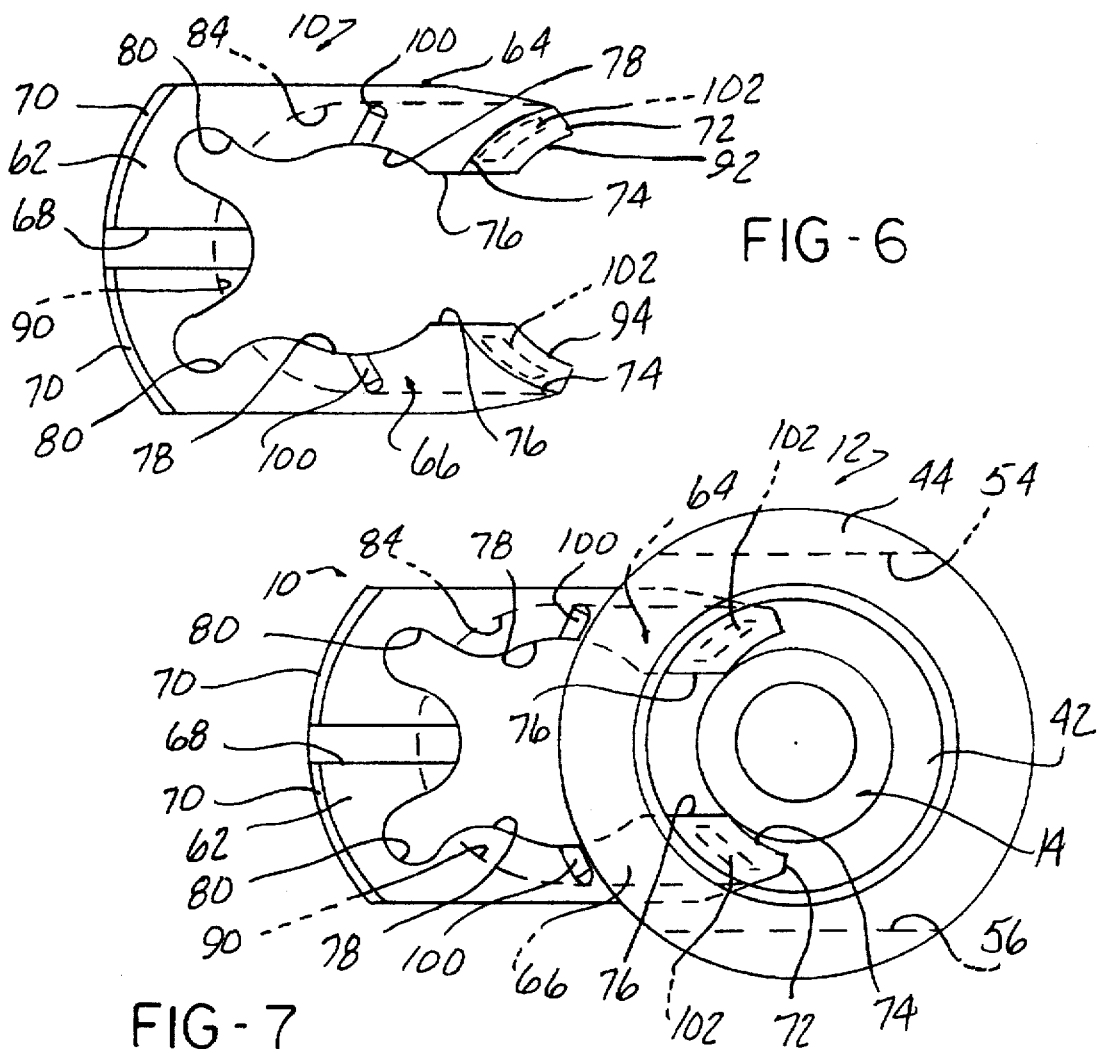
FIG-6
FIG-7
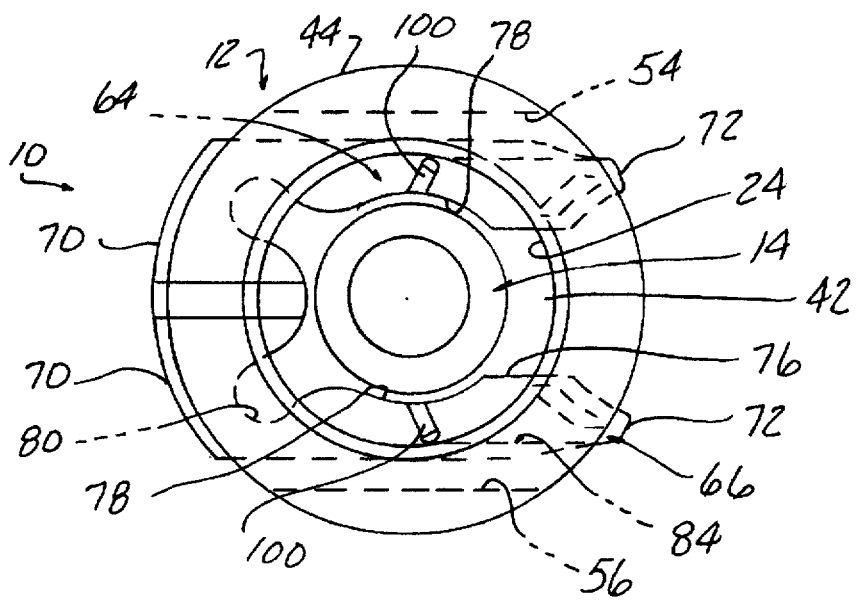
FIG-9

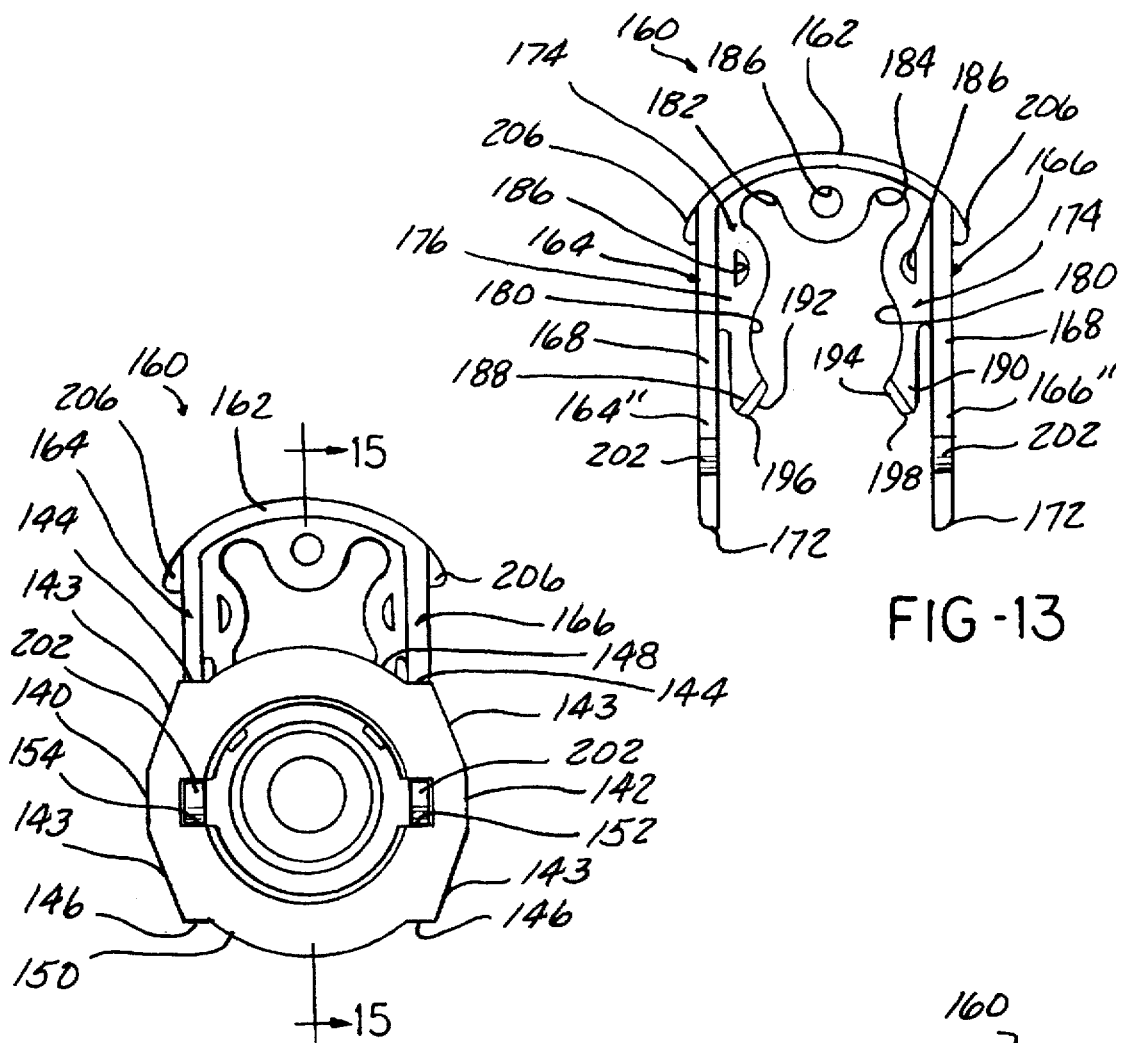
FIG-13
FIG-14
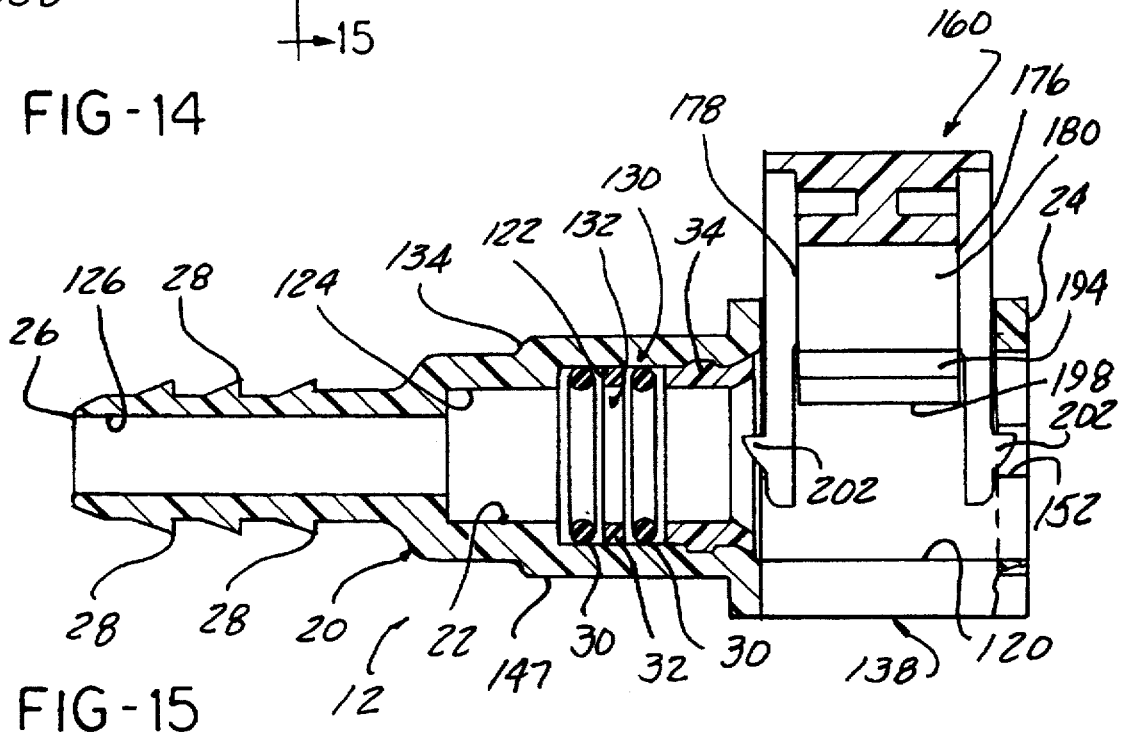
FIG-15

QUICK CONNECTOR WITH SNAP-ON RETAINER

CROSS REFERENCE TO CO-PENDING APPLICATION

This application is a continuation-in-part of U.S. Pat. application Ser. No. 08/334,754, filed Nov. 4, 1994 in the names of George Szabo and Andrew G. McGuire and entitled "Quick Connector With Snap-On Retainer", now U.S. Pat. No. 5,542,716 issued Aug. 6, 1996.

BACKGROUND OF THE INVENTION

1. Field Of The Invention

The present invention relates, in general, to quick connectors and, more specifically, to quick connectors including an internal retainer and means providing an indication of complete coupling between the male and female elements of the quick connector.

2. Description Of The Art

Snap-fit or quick connectors are employed in a wide range of applications, particularly, for joining fluid carrying conduits in automotive and industrial application. In a typical quick connector, a retainer is fixedly mounted within a bore in a housing of a female connector component or element. The retainer has a plurality of radially extending legs which extend inwardly toward the axial center line of the bore in the housing. A tube or fitting to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs.

While such a retainer is usually effective in releasably coupling the male and female elements of a quick connector, it is possible that the male fitting may be partially, but not fully seated or coupled to the internal seal elements in the bore of the female component and not fully locked in position by the retainer legs. In this partially engaged position, the male fitting may work itself free of the housing thereby leading to leaks in the fluid delivery system.

As it is desirable to ensure that the male and female elements are fully coupled to prevent leaks, various indicators have been provided to indicate a full coupling or seating of the male fitting in the female element. In one type of indicator shown in U.S. Pat. No. 4,925,217, a deformable member is assembled within the fitting which includes elongated members extending out of the housing between the male and female elements prior to coupling and which are retracted, and no longer visible, once the coupling has been fully accomplished. The annular member in this device remains in assembly with the quick connector and contributes to component count, tolerance stack-up and possible misassembly. Furthermore, the elongated members which are visible during non-coupling of the connector are, by design, not visible after coupling is fully effected. In many applications, such as an extremely crowded engine compartment of a motor vehicle, the installed coupling may be difficult to see and inspect closely. Thus, the inability to see the elongated members from a distance or from an awkward position will not result in a high degree of confidence that the coupling has in fact fully taken place.

Other types of visual indicators, as shown in U.S. Pat. No. 4,946,205, are removable after full coupling of the male and female quick connector elements. However, the indicator disclosed in this patent is complex and adds considerable axial length to the quick connector.

To overcome these problems and to provide an advancement in the quick connector art, the quick connect insertion indicator clip disclosed in U.S. Pat. No. 5,152,555, assigned to the assignee of the present invention, was devised. This indicator clip includes a flag portion positioned externally of the quick connector and has members extending from the flag portion to embrace the female element of the quick connector. Engagement tabs extending from the members through registering apertures in the female element will contact an abutment surface formed on the male element upon full coupling of the male and female components to enable removal of the indicator device as verification of complete or full coupling. When coupling is incomplete or not fully effected, the indicator device cannot be removed from the female component.

While the insertion indicator clip disclosed in U.S. Pat. No. 5,152,555 provides an easily visible indication of complete coupling of quick connector components, the quick connector still requires a separate retainer to lockingly couple the male and female components together.

U.S. Pat. No. 5,102,313 discloses a retainer clip having a centrally located slot for envelopingly engaging the radial flange on a male conduit when the male conduit is fully inserted into the female portion of a coupler. However, in this arrangement, if the clip is inserted into the housing axially ahead of the radial flange on the male conduit, the length of the male conduit between the flange and the forward tip end of the male conduit is sufficient to at least partially engage a seal mounted in the female housing. This could cause a subsequent leak since the male conduit, while appearing to be fully inserted into the female housing, is only partially engaged with the seal and, further, is not locked in a fixed portion in the female housing by the retainer clip.

Thus, it would be desirable to provide a retainer for a quick connector which performs the dual functions of lockingly engaging the female and male components as well as providing a visual indication of complete or incomplete coupling between the male and female components. It would also be desirable to provide a retainer for a quick connector which has a simple construction for a low manufacturing cost and ease of use. It would also be desirable to provide a retainer for a quick connector which provides a visual indication of coupling and which does not require extensive modification to existing quick connector designs. Finally, it would be desirable to provide a retainer for a quick connector which can be installed in a temporary engaged position on the female component of the quick connector for shipment and subsequent use.

SUMMARY OF THE INVENTION

The present invention is a quick connector with a snap-on retainer which provides releasible locking engagement of male and female components of the quick connector and a visual indication of complete or incomplete coupling between the male and female components.

The quick connector includes mating male and female components or elements. The female component includes a housing having an axially extending bore terminating at an open end of the housing for receiving the male element therein. A transverse extending bore is formed in the housing in communication with the axially extending bore. The male component has a radially enlarged portion spaced from one end. A retainer means is slidable through the transverse bore in the housing only when the male component is fully coupled to the female component for releasably locking the male and female components together.

In a first embodiment, the retainer means preferably comprises a body having an end wall and first and second spaced legs extending from the end wall and terminating in outer ends. The first and second legs define an aperture therebetween extending from an open end between the outer ends of the first and second legs and a closed end at the end wall of the body.

A radial flange receiving means is formed in the first and second legs for receiving the radial flange on the male component only when the male component is fully seated in the female component and for permitting sliding movement of the first and second legs of the retainer means over the male component as the body is urged through the transverse bore in the housing.

The nominal width of the opening between the first and second legs is less than the outer diameter of the male component adjacent to the radial flange on the male component. In a preferred embodiment, the radial flange receiving means includes first and second slots formed respectively in the first and second legs of the body. The first and second slots are co-planarly arranged on opposite sides of the aperture between the first and second legs. The width of the transverse bore in the housing, the width of the body of the retainer means and the dimensional spacing between the first and second slots in the first and second legs of the body and one side wall of the body surrounding the transverse bore is such that the first and second slots are alignable with and slidingly engage the radial flange on the male component when the body is slidingly urged into the transverse bore in the housing. This dimensional relationship prohibits the inward sliding movement of the body of the retainer means into the transverse bore of the housing over and around the male component if the male component is not fully seated in the female component since the slots in the first and second legs of the body are misaligned with the radial flange in the male components.

The outer ends of the first and second legs of the body have a cam surface means formed thereon for urging the first and second legs oppositely outward from each other as the body is urged over the male component.

The housing of the female component preferably includes opposed surfaces at the intersection of the axially extending bore and the transverse bore. The opposed surfaces block the outward movement of the first and second legs of the body when the body is urged into the transverse bore and the male component is not fully coupled to the female component to prevent full insertion of the body into the housing thus provides an indication to the user that the male component is not fully seated in or coupled to the female component.

Means are also formed on the body for releasably locking the body in a partially inserted position in the transverse bore in the housing. In this position, the ends of the first and second legs are clear of the axially extending bore in the housing to enable insertion of the male component into the axially extending bore in the housing. Preferably, the releasable locking means comprises at least one pair of projections formed on at least one of the first and second legs. The projections are spaced apart to respectively engage an outer surface of the housing and an inner portion of the housing. Preferably, a pair of spaced projections are formed on each of the first and second legs of the body.

Means are also formed on the end wall of the body for limiting the insertion distance of the body into the transverse bore in the housing. The distance limiting means preferably comprises a lip formed on and extending outward from the end wall of the body. The lip engages the housing when the body is urged into the transverse bore in the housing.

A predetermined dimensional relationship is provided between the tip end of the male component, the seal means mounted in the female component and the location of a radial flange engaging means on the retainer to insure either a fully inserted, sealed and locked position of the male component in the female component or a blocking of the axial insertion of the male component into the female component to prevent the tip end of the male component from engaging the seal means if the retainer is inserted into the housing axially ahead of the radial flange on the male component. Preferably, when the male component is fully inserted in a sealed position in the female component, a distance between the first tip end of the male component and the closest end of the seal means is less than or equal to a second distance between the radial flange engaging means on the retainer and the opposite or farthest side edge of the retainer. This dimensional relationship insures that the retainer can be inserted into the housing and about the radial flange on the male component only when the male component is in a fully sealed, inserted position in the female component.

In a second embodiment, the retainer has first and second arms formed respectively on facing surfaces of the first and second side legs. The end portions of each of the first and second arms are cantilevered from the respective first and second side legs and cam apart upon engagement with the male component when the male component is fully inserted into the female component and a radial flange engaging surface formed on the retainer is positioned to slide past the radially enlarged flange on the male component. In this embodiment, the radial flange engaging surface or edge is spaced closer to one side edge than the other side edge of the body of the retainer. Preferably, two oppositely disposed radial flange engaging surfaces are formed on and spaced from opposite side edges of the body of the retainer. This enables one radial flange engaging surface to slide past the radial flange on the male component when the male component is fully inserted into the bore of the housing of the female component and permit the first and second arms to cam over the male component. At the same time, the other radial flange engaging surface is positioned, when in the same orientation of the retainer with respect to the female component, to slidingly engage the radial flange on the male component when the male component is partially inserted into the female component such that the tip end of the male component is prevented from contacting a seal means mounted within the housing of the female component to provide a gross fluid leak and thereby a visible indication of the partial inserted position of the male component in the female component.

Lock means are formed on at least one and preferably each of the side legs of the body of the retainer and engage axially extending grooves formed in the bore in the housing of the female component to releasibly lock the retainer in a partially inserted storage position in the female component. Further, the lock means engage exterior lock surfaces on the housing of the female component when the retainer is fully inserted through the opposed apertures in the housing to releasibly lock the retainer to the housing and, at the same time, to fix the male component in a fully sealed position within the female component without any movement of the male component relative to the female component.

In one embodiment, the lock means is formed as an axially extending projection formed perpendicular to an exterior surface of each of the side legs of the retainer. In another embodiment, the lock means is formed of projections extending axially from opposite side edges of each of the first and second side legs of the retainer.

Finally, grip tabs formed on the exterior of the first and second side legs adjacent the end wall of the body of the retainer and engage recesses formed in the housing to limit the insertion distance of the retainer into the housing.

The snap-on retainer of the present invention provides unique advantages when used with a previously devised quick connector. One, the retainer serves the dual functions of lockingly engaging the male and female components of the quick connector and, at the same time, providing a visual indication of incomplete coupling of the male and female components. The retainer is of simple construction for a low manufacturing cost and ease of use. Further, the unique retainer of the present invention does not require extensive modification to existing quick connector designs. The present snap-on retainer also reduces or minimizes the axial movement of the male component when engaged with the female component. The retainer of the present invention may be mounted in a partially inserted position on the female component of the quick connector for shipment and for ease of use after the male component has been inserted into the female component of the quick connector. Finally, the retainer of the present invention, when formed with opposed radial flange engaging edges, is completely symmetrical in construction to enable the retainer to be inserted in any direction through the first and second apertures in the housing and in any endwise orientation thereby simplifying its use as part of the quick connector in any application and orientation of the quick connector.

BRIEF DESCRIPTION OF THE DRAWINGS

The various features, advantages and other uses of the present invention will become more apparent by referring to the following detailed description and drawings in which:

FIG. 1 is an exploded, perspective view of a quick connector with a snap-on retainer constructed in accordance with a first embodiment of the present invention;

FIG. 2 is a longitudinal cross-sectional view showing the assembled position of the female and male components of the quick connector and the snap-on retainer depicted in FIG. 1;

FIG. 6 is a plan view of the retainer shown in FIG. 3;

FIG. 7 is a right end view of FIG. 2 showing the shipping position of the retainer in the female component of the quick connector;

FIG. 9 is a right end view of FIG. 2 showing the assembled male and female components of the quick connector and the retainer;

FIG. 13 is an end view of the snap-on retainer shown in FIGS. 11 and 12;

FIG. 14 is an end view of the quick connector and snap-on retainer shown in a partially inserted, storage position of the snap-on retainer;

FIG. 15 is a cross sectional view generally taken along line 15—15 in FIG. 14;

DESCRIPTION OF THE PREFERRED EMBODIMENTS

Figure 3:
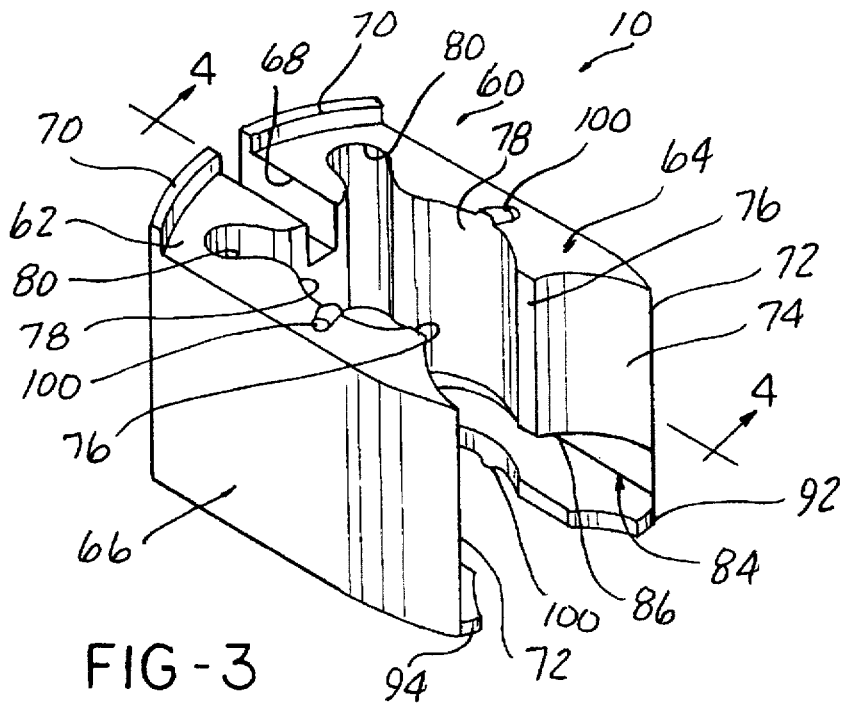
FIG. 3 is a an enlarged, perspective view of the snap-on retainer of the present invention.
Figure 4:
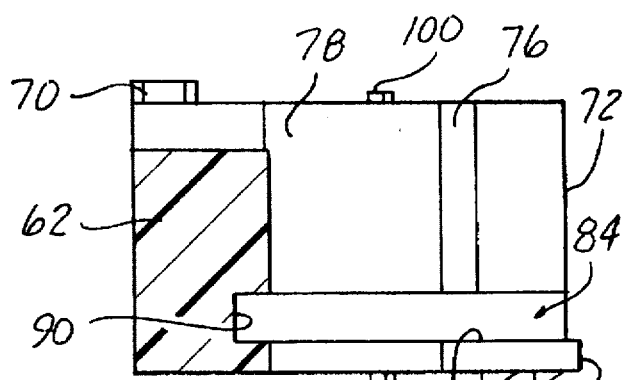
FIG. 4 is a cross-sectional view generally taken along line 4—4 in FIG. 3.

Referring now to the drawing, and to FIGS. 1 and 2 in particular, there is depicted a first embodiment of a snap-on retainer 10 which lockingly engages female and male components 12 and 14, respectively, of a quick connector 16 together.

The following description of the female connector component or element 12 is by way of example only as the female connector component 12 may have any suitable shape typically found in quick connectors.

The female connector component 12 includes a housing 20 having an elongated, axially extending, stepped axial bore 22 extending therethrough from a large diameter first end 24 to a smaller diameter second end 26. A plurality of raised, annular ridges or flanges 28 are formed on one end of the housing 20 adjacent the second end 26 of the axial bore 22 for securely engaging a flexible conduit or hose, not shown.

As is typical in quick connectors, one or two O-rings 30, and an interposed spacer 32 and top hat 34 are mounted within an intermediate portion of the stepped bore 22 for sealingly engaging one end of the male component or fitting 14 as shown in FIG. 2.

As shown in FIGS. 1 and 2, and as is typical, the male component or fitting 14 is in the form of a tubular member having a first end 40 and an annular, radially extending flange or upset 42 formed on and spaced from the end 40. In a fully engaged or coupled position shown in FIG. 2, the end 40 of the fitting 14 extends through and beyond the O-rings 30, the spacer 32 and the top hat 34, with the O-rings 30, the spacer 32 and the top hat 34 forming a seal about the fitting 14. In this fully coupled position, the radial flange 42 on the male component or fitting 14 is positioned within an enlarged diameter end portion 44 in the housing 20 of the female component 12.

A transverse bore 45 is formed in the enlarged end portion 44 of the housing 20 in communication with the axial bore 22 extending through the housing 20. The transverse bore 45 formed in the housing 20 preferably by two opposed, identically shaped apertures 46 and 48 formed on opposite sides of the enlarged end portion 44 of the housing 20. Each aperture 46 and 48 forms a pair of opposed arcuate shaped sidewalls 50 and 52 on opposed surfaces of the enlarged end portion 44 of the housing 20. The sidewalls 50 and 52 are spaced apart a predetermined distance which is slightly greater than the width of the retainer 10, as described hereafter, to enable sliding insertion of the retainer 10 into the transverse bore formed in the enlarged end portion 44 of the housing 20. The intersection of the transverse bore 45 and the axial bore 22 in the housing 20 forms a pair of opposed surfaces 54 and 56 in the enlarged end portion 44 of the housing 20. The surfaces 54 and 56 have a generally planar configuration as shown in FIGS. 7–10.

The retainer 10 is shown in greater detail in FIGS. 3, 4, 5 and 6. Preferably, the retainer 10 is in the form of a unitary, one piece body 60 which includes an end wall 62 and first and second legs 64 and 66 spaced apart and extending generally in parallel from the end wall 62. The body 60 is formed of a suitable material such as a heat stabilized, glass filled Nylon 12-23x, by example only.

The end wall 62 has a generally arcuate exterior shape, by way of example only. A recess 68 is formed in one side of the end wall 62. The recess 68 engages a nub or projection 69 formed on the sidewall 52 of the end portion 44 of the housing 20 to properly orient the retainer 10 in the end portion 44. Further, a raised lip 70 formed of two discontinuous portions disposed on both or one side of the recess 68 is also formed in and extends outward from one side of the end wall 62. The purpose of the lip 70 will be described in greater detail hereafter in conjunction with the description of FIG. 9.

As each of the first and second legs 64 and 66, respectively, are substantially identically constructed, the following description of the first leg 64 will be understood to apply equally to the second leg 66. The first leg 64 extends from the end wall 62 and terminates in an outer end 72. A cam surface means preferably in the form of an arcuate shaped surface 74 extends from the outer end 72 of the first leg 64 inward toward the opposed second leg 66 and terminates in a flat 76. The flat 76 has an angular orientation with respect to the outer surface of the leg 64 and diverges from the opposed flat 76 on the leg 66 to further provide camming of the legs 64 and 66 outward when the retainer 10 is urged over the male component or fitting 14. The inner surface of the first leg 64 opposing the second leg 66 extends from the flat 76 toward the end wall 62 in the form of a generally circular or arcuate surface 78 which is sized to securely engage the peripheral surface of the male component or fitting 14 when the retainer 10 is inserted into the enlarged end portion 44 of the female component 12, as described hereafter and shown in FIG. 9.

As shown more clearly in FIG. 7, the distance or spacing between the cam surfaces 74 and the flats 76 of the legs 64 and 66 of the body of the retainer 60 is less than the nominal O.D. of the fitting 14 on adjacent sides of the radial flange 42.

Each leg 64 and 66 is further formed with a cutout or notch 80 at the juncture of each leg 64 and 66 and the end wall 62. The cutout or notch 80 permits easy flexure or deflection of the legs 64 and 66 from the normal position shown in FIGS. 3, 6 and 7 to an outwardly deflected position as the retainer 10 is urged into the female component 12 and over the fitting 14.

As shown in FIGS. 3–10, the retainer 10 is uniquely formed with radial flange receiving means denoted generally by reference number 84 which is formed in the body 60 for receiving the radial flange 42 on the fitting 14 only when the fitting 14 is fully seated or coupled in the bore 22 in the female component 12 to permit the sliding movement of the first and second legs 64 and 66 over the male element 14 as the retainer 10 is urged through the bore 45 in the housing 20 of the female component 12. The radial flange receiving means 84 is preferably in the form of a continuous U-shaped slot including first and second spaced, co-planar, slot portions 86 and 88, respectively, disposed adjacent to the first and second legs 64 and 66 and interconnected by an arcuate shaped end slot portion 90 formed in the end wall 62 of the body 60 of the retainer 10.

Figure 5:
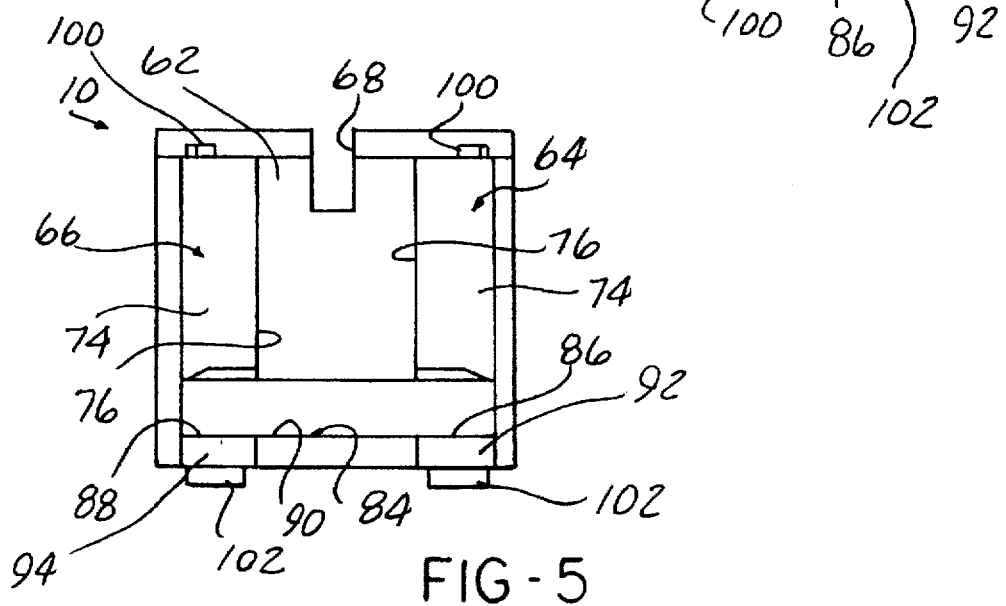
FIG. 5 is a righthand end view of the retainer shown in FIG. 3.

The slot portions 86 and 88 are formed between the cam-like surfaces 74 and the flat 76 on each of the first and second legs 64 and 66 and an outer side edge wall 92 and 94 on each of the first and second legs 64 and 66, respectively, as shown in FIGS. 3 and 5.

The slot portions 86 and 88 and the interconnecting end slot portion 90 form a continuous internal slot or recess in the retainer 10 which is sized to slidably move over the radial flange 42 on the male fitting 14. Thus, the width of the slot portions 86, 88 and 90 is only slightly larger than the width or thickness of the radial flange 42 on the fitting 14.

A pair of projections are formed on at least one and preferably on both of the legs 64 and 66 of the body 60 of the retainer 10 for releasably mounting the retainer 10 in a temporary shipping position, shown in FIG. 7, on the female component 12. Preferably, the pairs of projections on the legs 64 and 66 include a first projection 100 formed on the outer side edges of each leg 64 and 66. The projections 100 angle outwardly from the side edge of the legs 64 and 66 and terminate in an outwardly extending tip or head.

A second set of projections, each projection denoted by reference number 102 as shown in FIGS. 4–8, is also provided on the outer side edge walls 92 and 94 of the body 60.

The pairs of projections 100 and 102 enable the retainer 10 to be temporarily and releasably attached to the female component 12, as shown in FIG. 7, in a temporary position for shipping and pre-use. In this position, the projections 100 engage the outer surface of the enlarged end portion 44 of the housing of the female component 12, while the pair of projections 102 engage an inner portion of the housing 44, such as an edge of the top hat 34 mounted in the stepped portion of the bore 22 of the female component 12, as shown in FIG. 2. This releasably retains the retainer 10 in a partially inserted position into the transverse bore in the female component 12 with the ends 72 of the legs 64 and 66 of the retainer 10 partially extending into the axially extending bore in the enlarged end portion 44 of the female component 12, but providing sufficient clearance to enable insertion of the male fitting 14 into the female component 12. The resilient nature of the material forming the retainer 10 and the small projection height of the projections 100 and 102 enable the retainer 10 to be forcibly urged from the temporary position shown in FIG. 7 to the fully inserted position shown in FIG. 9 during which movement the projections 100 and 102 snap over the mating surfaces in the female component 12, as described in greater detail hereafter.

In use, the retainer 10 can be partially inserted and releasably locked in place in the female component 12, as shown in FIG. 7 and described above. Next, the fitting 14 is engaged with the female component 12 by inserting the end 40 of the male fitting 14 through the first end 24 in the female component 12 and into the stepped portion of the bore 22 in the female component 12 as shown in FIG. 2. When the male component or fitting 14 is fully seated or coupled to the female component 12 in the fully inserted position shown in FIG. 2, the radial flange 42 on the male fitting 14 will be disposed in the position shown in FIG. 2 within the intersecting axial and transverse bores in the enlarged end portion 44 of the female component 12. Only when the fitting 14 is fully coupled or seated in the female component 12, will the radial flange 42 on the fitting 14 be aligned with the radial flange receiving means or slots 86 and 88 in the retainer 10.

Figure 8:
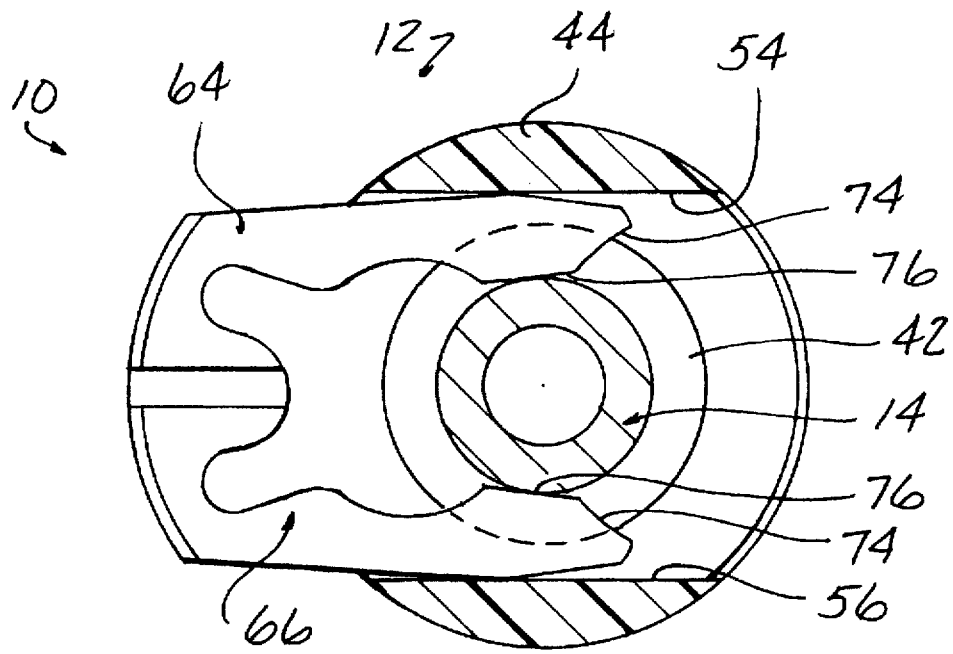
FIG. 8 is a cross-sectioned, right end view showing an intermediate insertion position of the retainer into the female component.

The alignment of the radial flange 42 and the radial flange receiving means or slots 86 and 88 enables the retainer 10 to be forcibly slid inward into the enlarged end portion 44 of the female component 12 with the slots 86 and 88 sliding over the radial flange 42 on the fitting 14. During such inward movement of the retainer 10, when the fitting 14 is fully seated in the female component 12, the arcuate, cam surfaces 74 on the legs 64 and 66 will slidably engage the exterior surface of the male fitting 14 and deflect oppositely outward from the opposite leg 64 or 66, as shown in FIG. 8, a sufficient amount to enable the legs 64 and 66 to pass over the O.D. of the male fitting 14 and snap back into the normal, substantially parallel position in which the arcuate surface 78 in each of the legs 64 and 66 is disposed in close proximity to or registry with the exterior surface of the male fitting 14. This snap action may produce a "click" sound to indicate full engagement of the retainer 10 about the fitting 14. Further, the lip 70 on the retainer 10 will engage the exterior surface of the housing of the female component 12 to limit the amount of insertion distance of the retainer 10 into the female component 12, as shown in FIG. 9.

Figure 10:
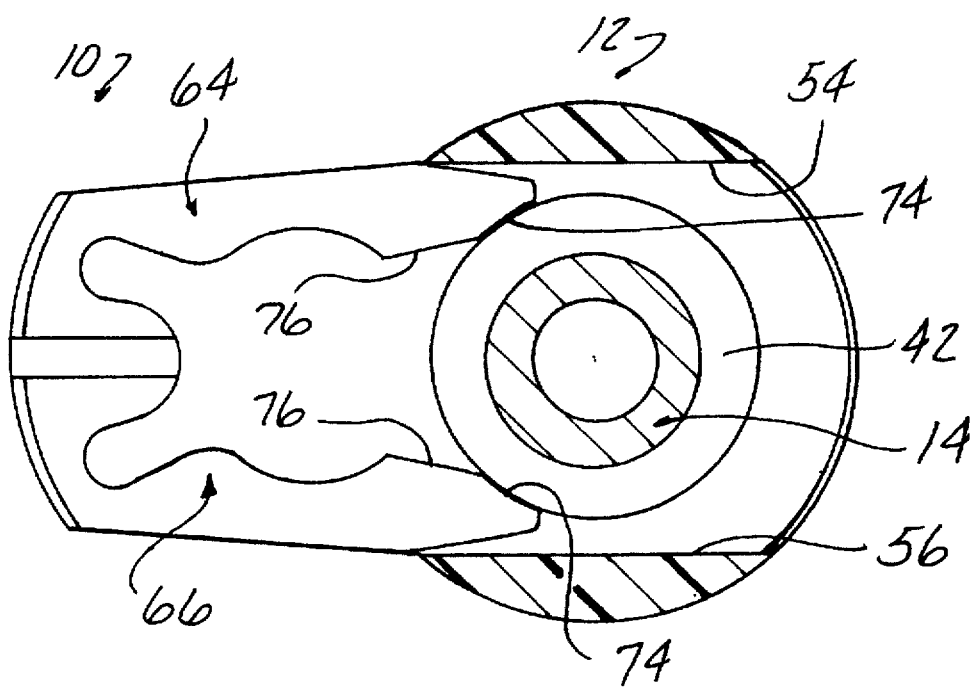
FIG. 10 is a cross-sectioned, right end view showing the blocked position of the retainer when the male component is not fully seated in the female component of the quick connector.

In the event that the fitting 14 is not fully seated or coupled in the bore 22 of the female component 12, the radial flange 42 on the male fitting 14 will be disposed rearward of the fully coupled position shown in FIG. 2. Due to the dimensional relationship between the width of the retainer 10 and the width of the opening between the sidewalls 50 and 52 about the apertures 46 and 48 in the enlarged end portion 44 of the female component 12, when the retainer 10 is forcibly urged into the enlarged end portion 44, the slots 86 and 88 will be misaligned with radial flange 42 on the male fitting 14. This misalignment will cause the cam surface 74 on the legs 64 and 66 to engage the radial flange 42 and deflect the legs 64 and 66 apart a greater distance than when the radial flange 42 is aligned with the slots 86 and 88. This greater outward movement or deflection of legs 64 and 66 will cause the legs 64 and 66 to engage the opposed surfaces 54 and 56 in the enlarged end portion 44 of the female component 12, as shown in FIG. 10 thereby blocking further insertion of the retainer 10 into the female component 12. This provides an easily visible indication that the fitting 14 is not fully seated or coupled in the female component 12. Adjustments can be made to the position of the fitting 14 relative to the female component 12 to fully seat or couple the fitting 14 and female component 12 together and to bring the radial flange 42 on the fitting 14 into alignment with the slots 86 and 88 in the retainer 10.

When it is desired to decouple the female component 12 and the fitting 14, the retainer 10 is forcibly pulled outward from the female component 12 either completely from the female component 12 or back to the temporary shipping position shown in FIG. 7. This releases the retainer 10 from the radial flange 42 on the male fitting 14 permitting disengagement of the fitting 14 from the female component 12.

Referring now to FIGS. 11-18, there is depicted a second embodiment of the quick connector of the present invention. In this embodiment, the female component 12 is substantially identical to the female component described above and shown in FIGS. 1 and 2 in that it includes a housing 20 having an elongated, axially extending, internal stepped bore 22 extending from a large diameter first, open end 24 to a smaller diameter, second open end 26, as shown in detail in FIG. 15. The stepped bore 22 in this embodiment, as in the first embodiment described above, includes a first bore portion 120 extending from an opening at the first end 24 of the housing 20 to a second smaller diameter second stepped bore portion 122. A third yet smaller diameter stepped bore portion 124 extends axially from one end of the second stepped bore portion 122 and communicates to a still smaller fourth stepped bore portion 126 which extends to the open second end 26 of the housing 20.

As is conventional, a top hat or bearing 34 is mounted in the second stepped bore portion 122 immediately adjacent the end of the first bore portion 120. A seal means 130 is also mounted in the second stepped bore portion 122 between one end of the top hat 34 and the third stepped bore portion 124. The seal means 130 preferably is formed of a pair of spaced seal members or O-rings 30 between which is interposed a spacer 32. The seal means 130 has a first end 132 adjacent one end of the top hat 34 and an opposed second end 134 disposed adjacent to one end of the third stepped bore portion 124.

As described in greater detail hereafter, the inner diameter of the first stepped bore portion 130 is sized to slidably receive the outer diameter of the radially enlarged flange or upset bead 42 formed on the male component or fitting 14. Further, the inner diameters of the seal means 130 and the top hat 34 are sized to sealingly engage the outer diameter of the end portion 41 of the male component 14 extending from the radially enlarged flange 42 to the tip end 40 of the male component 14. The third stepped bore portion 124 has an inner diameter sized to snugly engage the outer diameter of the end portion 41 of the male component 14 when the male component 14 is fully inserted into the stepped bore 22 as described hereafter.

Figure 11:
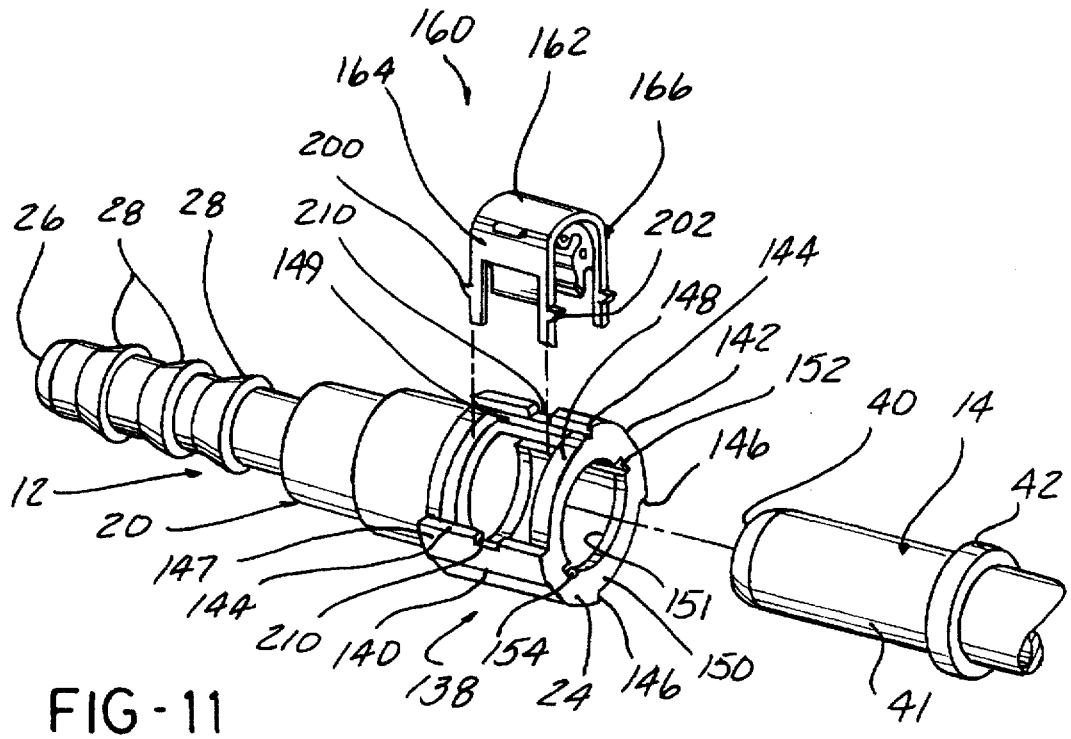
FIG. 11 is an exploded, perspective view of a quick connector with a snap-on retainer according to a second embodiment of the present invention.

In the embodiment shown in FIGS. 11, 14 and 15, a first end portion 138 of the housing 12 adjacent the first end 24 is formed with a pair of opposed, exterior flats 140 and 142. The flats 140 and 142 are diametrically opposed on the first end portion 138 and may be centrally located on each diametrical side of the first end portion 138 as shown in FIGS. 11 and 14. The adjacent surfaces of the housing 20 extend smoothly in a slightly angled or tapered manner to opposed pairs of lock surfaces or flats, such as a first flat 144 and a second flat 146. The flats 144 and 146 extend axially from the first end 24 of the housing 20 to a reduced diameter or necked-down portion 147 on the housing 20. Recesses 210 are formed substantially centrally on each flat 144 and 146. The opposed surfaces 148 and 150 of the first end portion 138 of the housing 20 between the flats 144 and 146 have a generally arcuate shape as shown in FIGS. 11 and 14. Apertures 149 and 151 are formed respectively in each surface 148 and 150. The apertures 149 and 151 are aligned to form a bore opening through the first end portion 138 of the housing 20 and disposed in communication with the first bore 120 in the housing 20.

Further, in this second embodiment, at least one and preferably a pair of diametrically opposed grooves 152 and 154 are formed internally within the housing 20 and extend axially from the first end 24 to the necked-down portion 147.

Figure 12:
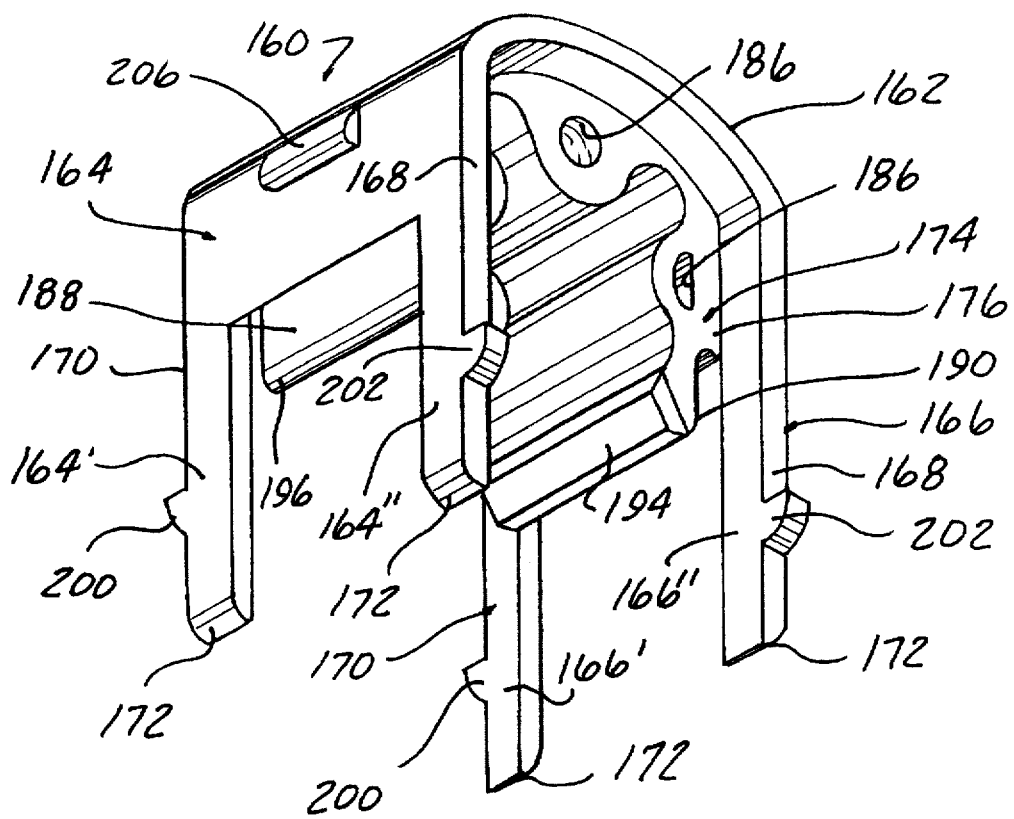
FIG. 12 is an enlarged, perspective view of the second embodiment of the snap-on retainer shown in FIG. 11.

The retainer 160, shown in FIGS. 11, 14-18, and in greater detail in FIGS. 12 and 13, is formed of a one-piece body having an end wall 162 formed of a generally curved or arcuate shape by way of example only, and first and second spaced side legs 164 and 166. The side legs 162 and 164 extend generally in parallel to each other from opposite ends of the end wall 162. Further, each side leg 164 and 166 is formed with opposed side edges 168 and 170 and an outer end 172.

In this embodiment of the retainer 160, each side leg 164 and 166 includes a central portion extending from an edge of the end wall 162 and two spaced leg portions 164' and 164" for the side leg 164 and 166' and 166" for the side leg 166 extending from central portion to the outer end 172.

A rib denoted generally by reference number 174 is formed as a unitary part of the retainer 160 and extends over a portion of each side leg 164 and 166 and, preferably, over the end wall 162. A radial flange engaging means is formed on the rib 174 by spacing at least a first side edge 176 of the rib 174 from the adjacent side edge 168 of the legs 164 and 166 of the retainer 160. For symmetrical purposes and to enable the retainer 160 to be inserted in either direction and in any end-to-end orientation into the apertures 149 and 151 in the housing 20, the opposite side of the rib 174 forming a side edge 178 is spaced a distance from corresponding side edge 170 of each of the legs 164 and 166 of the retainer 160. Preferably, the opposed side edges 174 and 176 of the means 174 are spaced from the side edges 168 and 170 of the legs 164 and 166, respectively, by a distance substantially equal to the thickness of the radial flange 40 on the male component 14.

The rib 174 is formed with opposed concave surfaces 180 which are spaced apart and shaped to snugly conform to and engage the exterior surface of the tubular portion of the male component 14 when the male component 14 is fully inserted into the housing 20 and the retainer 160 is inserted through the apertures 149 and 151 in the housing 20 and about the male component 14.

Further, recesses 182 and 184 are formed in the rib 174. Additional weight and material reduction is obtained by at least one and preferably a plurality of bores 186 which are spaced apart and extend generally between the opposed radial flange engaging surfaces 176 and 178 on the means 174.

The exterior opposed ends of the rib 174 terminate in arms 188 and 190 which are spaced from the side legs 164 and 166, respectively, as shown in FIGS. 12 and 13. A cam surface 192 and 194 is formed on the outer end of each arm 188 and 190, respectively, and generally has a trapezoidal shape with a curved or angled edge 196 and 198, respectively, which is adapted to engage the tubular portion of the male component 14 when the retainer 160 is inserted through the apertures 149 and 151 in the housing 20 into engagement with the male component 14. The cam surfaces 196 and 198 cam the arms 188 and 190 apart to enable the projections 188 and 190 to slide over the tubular portion of the male component 14 so that the tubular portion of the male component 14 slides into engagement with the concave surfaces 180 formed in the rib 174. The arms 188 and 190 then snap over the exterior surface of the male component 14 to securely affix the retainer 160 to the male component 14.

The retainer 160 also includes means for releasibly locking the retainer 160 to the housing 20 of the female component 12. The locking means preferably comprises one projection formed on at least one and preferably each of the side legs 164 and 166. In the embodiment shown in FIG. 12, byway of example only, the locking means includes a projection 200 formed on the side leg portion 164' and a projection 202 formed on the opposed side leg portion 164". Corresponding projections 200 and 202 are also formed on the opposite side leg portions 166' and 166". The projections 200 and 202 lie in the plane of the respective side leg 164 and 166 and project outwardly from the respective side edges 168 and 170 of the side legs 164 and 166.

Finally, a pair of grip tabs 206 are formed on the retainer 160, preferably at an edge of each side leg 164 and 166 and the end wall 162. The grip tabs 206 project outwardly from each side leg 164 and 166 and provide a means for inserting and removing the retainer 160 into and from the housing 20.

Referring now to FIGS. 14 and 15, there is depicted a partially inserted, shipping or storage position of the retainer 160 in the housing 20. In this position, the retainer 160 is inserted partially through the apertures 149 and 151 in the housing 20 until the locking projections 200 and 202 on each of the side legs 164 and 166 engage the grooves 152 and 154 extending axially through the first end portion 138 of the housing 20. This securely mounts the retainer 160 in the housing 20 during shipment or storage of the housing 20. When the male component 14 is to be inserted into the housing 20 of the female component 12, the retainer 160 can be removed from the partially inserted, shipping position by user force exerted on opposed side leg portions 164', 164", 166' and 166" to disengage the projections 200 and 202 from the recesses 152 and 154 in the housing.

Figure 17:
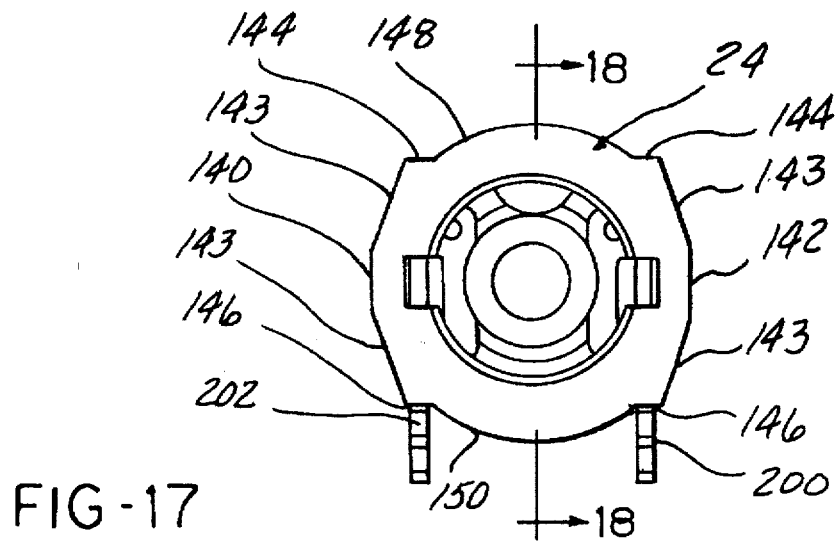
FIG. 17 is an end view of the quick connector and snap-on retainer shown in FIGS. 11 and 12 with the male component depicted in a fully inserted, sealed position in the female component of the quick connector.
Figure 18:
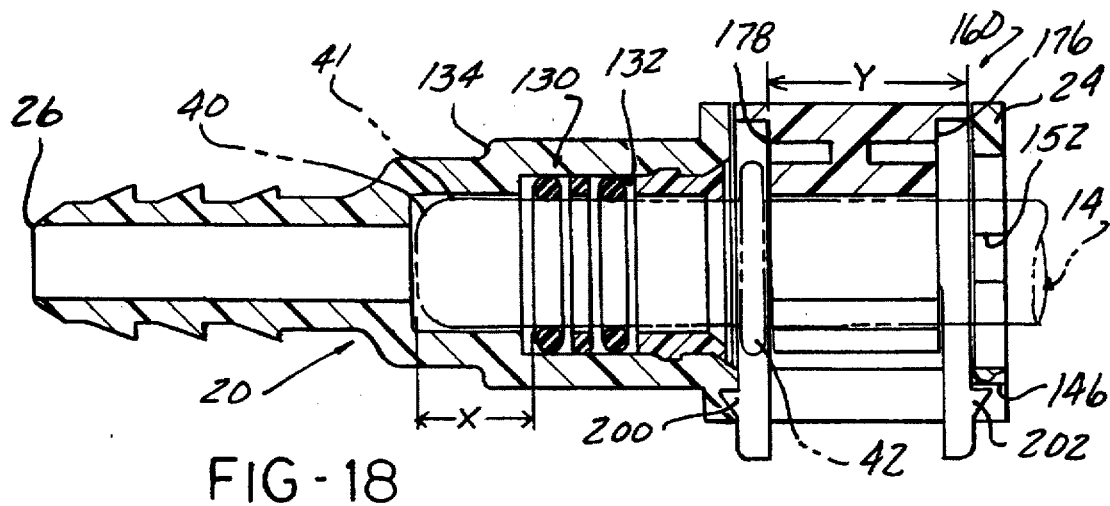
FIG. 18 is a cross sectional view generally taken along line 18—18 in FIG. 17.
Figure 16:
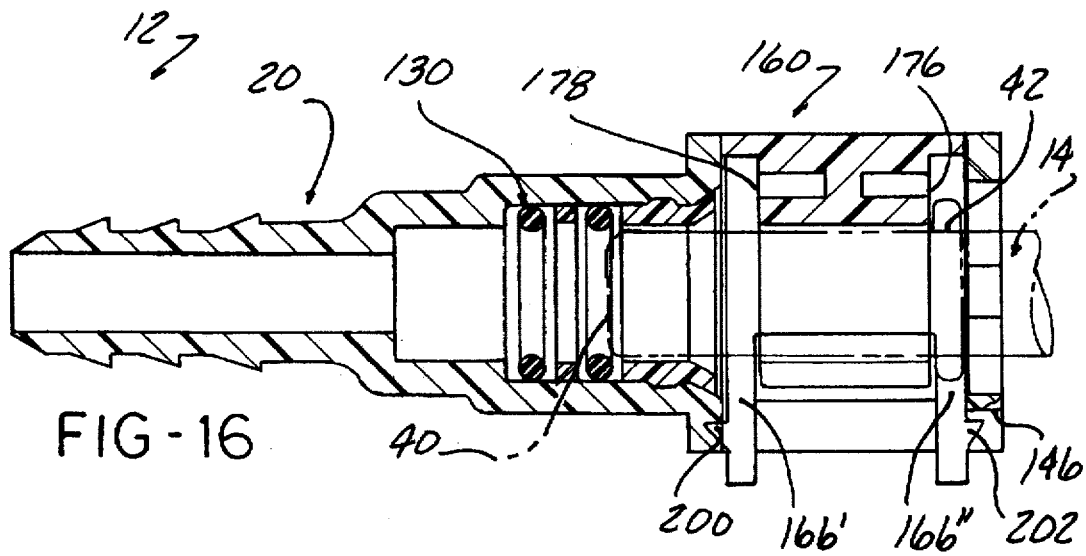
FIG. 16 is a cross sectional view of the second embodiment showing the male component in a partially inserted, gross leak position in the female component.

The retainer 160 with opposed radial flange engaging means or surfaces 176 and 176 is designed to provide a complete, sealed, non-moveable coupling of the male component 14 in the female component 12 as shown in FIGS. 17 and 18, or to block the male component 14 in a partially inserted position which prevents the tip end 40 of the male component 14, shown in FIG. 16, from engaging the seal means 130 in the housing 20 so as to provide a gross fluid leak and thereby a clear indication of an incomplete or partial insertion of the male component 14 into the female component 12 or, where the male component 12 is inserted somewhere between the positions shown in FIGS. 16 and 18, a visible indication of incomplete insertion due to the inability of the retainer 160 to be inserted through the apertures 149 and 151 and around the male component 14.

As shown in FIG. 16, if the male component 14 is only partially inserted into the open end 24 of the housing 20 of the female component 12 such that the retainer 160 can be inserted through the apertures 149 and 151 in the housing 20 axially ahead of the radially extending flange 42 on the male component 14, the radial flange engaging surface 176 in the retainer 160 will engage and block further insertion of the male component 14 into the housing 20 of the female component 12. This prevents the tip end 40 of the male component 14 from engaging the seal means 130 mounted in the housing 20 so as to provide the gross fluid leak indication of an incomplete insertion of the male component 14 into the female component 12.

In the event that the male component 14 is inserted further into the housing 20 of the female component 12, but not to its full insertion position where the tip end portion 41 is disposed in the third bore 124, the radial flange 42 on the male component 14 will be disposed at a position intermediate the opposite ends of the apertures 149 and 151 in the housing 20. In this position, the cam surfaces 194 on the arms 188 and 190 on the rib 174 will engage the radially extending flange 42 on the male component 14 and be cammed outwardly until they abut inner surfaces in the first end portion 138 of the housing 20. This abutment blocks further outward movement of the arms 188 and 190 to a separation distance sufficient to clear the male component 14 and thereby prevents further insertion of the retainer 160 into the housing 20. This again provides a visible indication that the male component 14 is not fully inserted into the female component 12.

FIGS. 17 and 18 depict the fully inserted, sealingly coupled position of the male component 14 in the female component 12. In this position, as shown in FIG. 18, the tip end 40 and the tip end portion 41 of the male component 14 project axially through and beyond the second end 134 of the seal means 130 by a predetermined distance labelled "X". The tip end portion 41 of the male component 14 is supported within the third bore portion 124 in the housing 20. This distance "X" is less than or equal to a distance "Y" formed between the radial flange engaging surface 178 on the retainer 160 and the opposite side edge 168 of the retainer 160. This dimensional relationship ensures a fully inserted, sealing engagement of the male component 14 in the female component 12.

Further, when the male component 14 is in the fully inserted position shown in FIG. 18, the radially extending flange 42 on the male component 14 is positioned adjacent a second end of the apertures 149 and 151 in the housing 20. This enables the retainer 160 to be inserted through the apertures 149 and 151 in the housing 20 with one of the radial flange engaging surfaces, such as surface 178 in the orientation of the retainer 160 shown in FIG. 18, to slide over one edge of the flange 42 so as to permit full insertion of the retainer 160 into the housing 20 and about the tubular portion of the male component 14. Since the radial flange 42 and the male component is disposed in the space or undercut between the side edge 170 of the retainer 160 and the adjacent flange engaging surface 178 of the rib 174, the cam surfaces 192 and 194 are able to engage and deflect the arms 188 and 190 sufficiently outwardly from each other to enable the male component 14 to pass into engagement with the concave surfaces 180 in the rib 174. In this position, the retainer 160 is fully engaged with the tubular portion of the male component 14 with one of the radial flange surfaces 176 and 178, such as the surface 178 shown in FIG. 18, abutting one surface of the radial flange 42 to prevent movement of the male component 14 relative to the housing 20 of the female component 12.

Further, as shown in FIG. 17, when the retainer 160 is fully inserted into the housing 20, as described above, the projections 200 and 202 on each of the side legs 164 and 166 snap into engagement with the flats 146 formed on the housing 20 to lock the retainer 160 in the fully inserted position into the housing 20. This prevents any unintentional disengagement of the male component 14 from the female component 12. The male component 14 is disengagable from the female component 12 only upon force exerted on the outer ends 172 of the side legs 164 and 166 of the retainer 160 sufficient to disengage the projections 200 and 202 from the flats 146 on the housing 20.

It should be noted that when the retainer 160 is in the fully inserted position in the housing 20 shown in FIG. 18, the grip tabs 206 fit within the recesses 210 formed in the flats 144 in the housing 20.

Referring now to FIGS. 19–23, there is depicted another embodiment of the quick connector with snap-on retainer of the present invention. In this embodiment, the housing 20 of the female component 12 is substantially identical to the housing 12 described above and shown in FIG. 11. The only exception is that the side surfaces 140 on the first end portion 138 of the housing 20 extend continuously as a planar surface between the opposed flats or ridges 144 and 146. The first end portion 138 of the housing also contains the same diametrically opposed, axially extending, internal grooves 152 and 154.

In this embodiment, the retainer 210 is substantially the same as the retainer 160 described above and shown in FIGS. 11–13 in that it includes an arcuate end wall 212 from which extend planar side legs 214 and 216. A rib 174, identical to the rib 174 described above and shown in FIGS. 11–13, is formed interiorly on the end wall 212 and the side legs 214 and 216. The rib 174 is formed with at least one and preferably two opposed side edges 176 and 178 which are spaced a predetermined distance from the edges 218 and 220 of the side legs 214 and 216, respectively.

As in the previous embodiment shown in FIGS. 11–13, the rib 174 terminates in a pair of opposed arms 188 and 190 which are spaced from the side legs 216 and 214, respectively. Each arm 188 and 190 has a cam surface 194 formed with an arcuate or angled outer edge 198.

In the retainer 210, the side legs 214 and 216 extend continuously in a planar form from their juncture to opposite ends of the end wall 212 to an outer edge 222. A corner 224 of each edge 222 is angled or curved to aid in guiding the retainer 210 into the apertures 149 and 151 in the housing 20.

Figure 19:
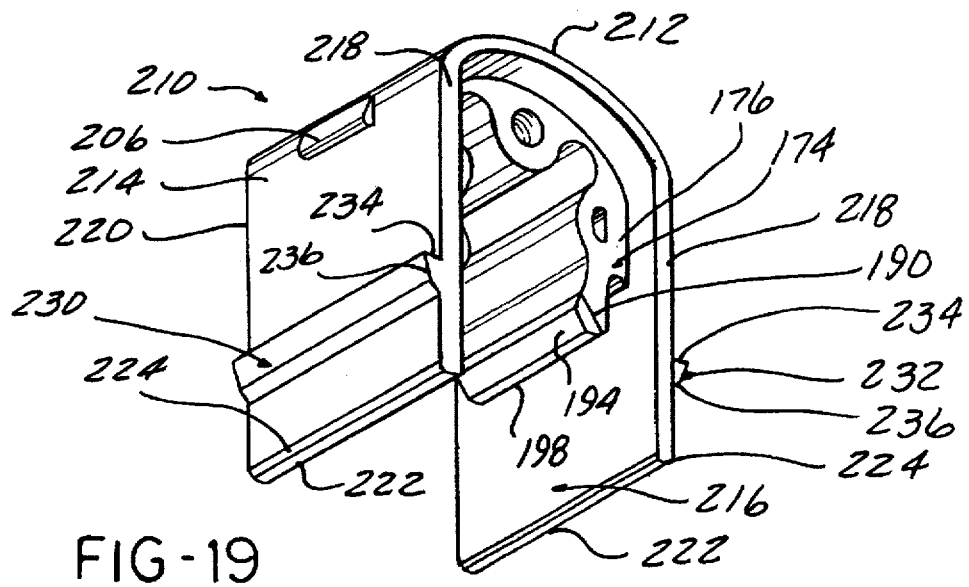
FIG. 19 is an enlarged, perspective view of a third embodiment of a snap-on retainer usable with the quick connector shown in FIG. 11.

In this embodiment, the means for locking the retainer 210 into the housing 20 includes a single projection on each side leg 214 and 216, such as projection 230 for the side leg 214 and projection 232 for the opposed side leg 216. Each of the projections 230 and 232 are identically formed with an upper flat 234 and an angled surface 236 extending from the flat 234 toward the outer end 222 of each side leg 214 and 216. As shown in FIG. 19, the projections 230 and 232 are spaced from the outer end 222 of each of the side legs 214 and 216. Further, the projections 230 and 232 extend substantially perpendicular from the main surface of each of the side legs 214 and 216.

Figure 20:
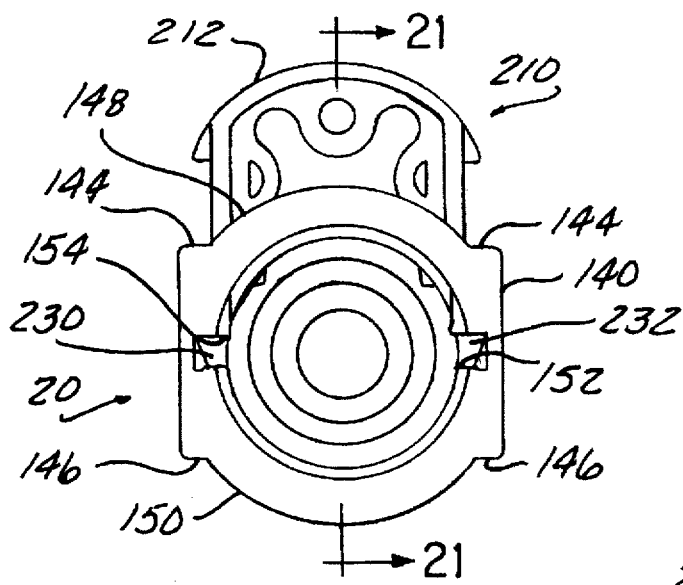
FIG. 20 is an end view of the snap-on retainer shown in FIG. 19 depicted in a partially inserted, storage position in the female component.
Figure 21:
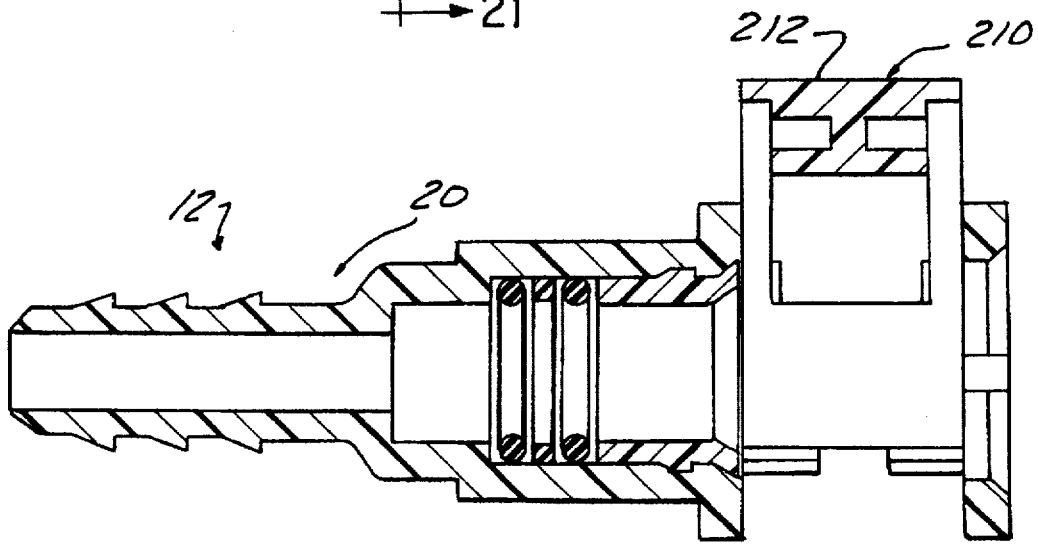
FIG. 21 is a cross sectional view generally taken along line 21—21 in FIG. 20.

The retainer 212 functions in the same manner as the retainer 160 described above. In FIGS. 20 and 21, the retainer 210 is depicted as being in a partially inserted, shipping position in the housing 20. In this position, the projections 230 and 232 engage the opposed grooves 154 and 152, respectively, in the first end portion 138 of the housing 20 to releasibly lock the retainer 210 in the partially inserted position. Inward force exerted on the side legs 214 and 216 to move the side legs 214 and 216 toward each other disengages the projections 230 and 232 from the grooves 154 and 152, respectively, to enable disengagement of the retainer 210 from the housing 20.

Although not shown in the drawing, the retainer 210 can also be inserted ahead of the radial flange 42 on the male component 14 when the male component 14 is only partially inserted into the bore 22 in the housing 20 in the same manner as described above and shown in FIG. 16. In this position, one of the radial flange engaging surfaces 176 or 178 on the rib 174 will engage a forward edge of the radial flange 42 on the male component 14 so as to prevent the tip end 40 of the male component 14 from engaging the seal means 132 disposed within the housing 20. This provides a gross fluid leak and a clear indication of the partial insertion of the male component into the housing 20.

Figure 22:
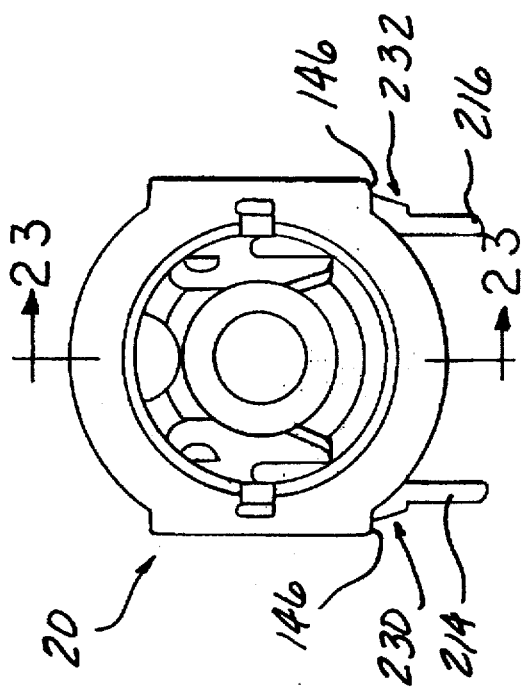
FIG. 22 is an end view of the quick connector shown in FIG. 11 with the third embodiment of the snap-on retainer depicted in a locking position with respect to fully sealed male component.
Figure 23:
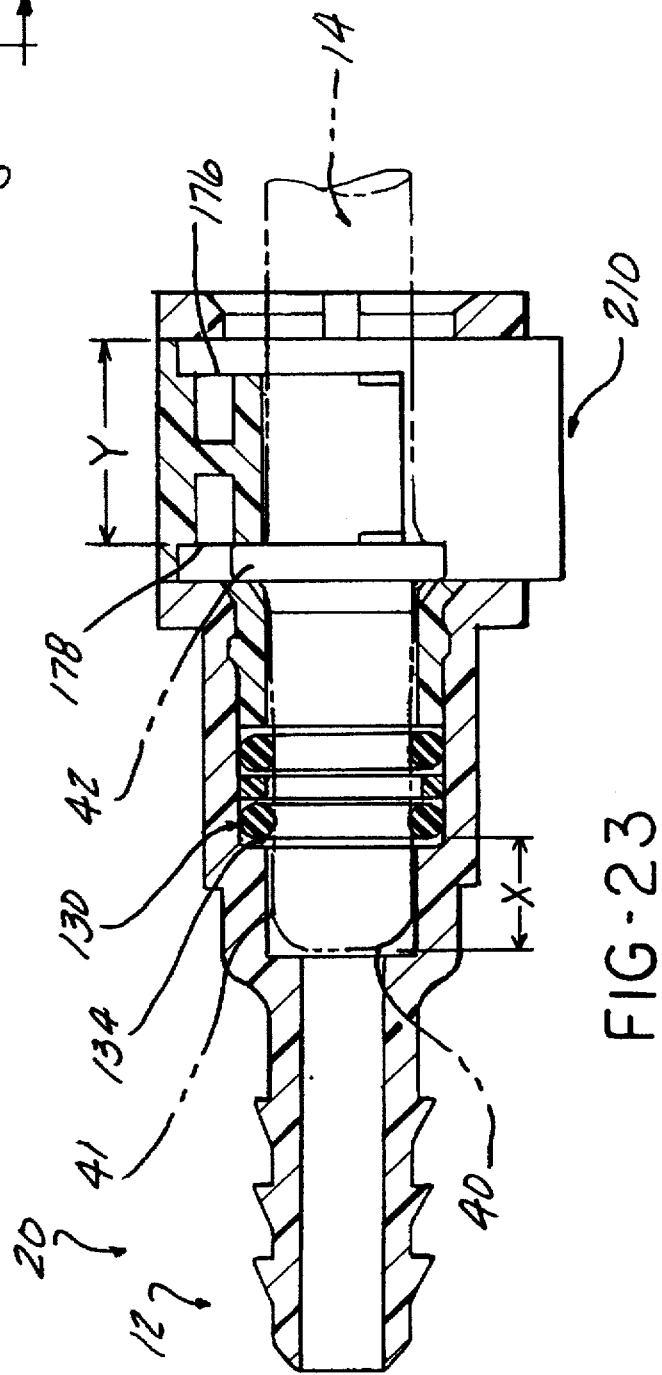
FIG. 23 is a cross sectional view generally taken along line 23—23 in FIG. 22.

Turning now to FIGS. 22 and 23, there is depicted the full insertion position of the retainer 210 into the housing 20 when the male component 14 is fully inserted into the stepped bore 22 in the housing 20 such that the tip end 40 and the adjacent end portion 41 of the male component 14 is supported within the third stepped bore 124 in the housing 20. In this full insertion position of the male component 14, the radial flange 42 on the male component 14 will be positioned adjacent one end of the apertures 149 and 151 in the housing 20. The retainer 210 can then be inserted through the apertures 149 and 151 in the housing 20 with the radial flange engaging surface 178 on the retainer 210 sliding past and one edge of the radial flange 42 on the male component as shown in FIG. 23.

In this position, the tip end 40 of the male component 14 extends a predetermined distance "X" from the second end 134 of the seal means 130 in the housing 20. This distance "X" is less than or equal to a distance "Y" formed between the radial flange engaging surface 178 on the retainer 210 and the opposite side edge 218 of the retainer 210. This dimensional relationship ensures a fully inserted, sealing engagement of the male component 14 in the female component 12.

Further, in the fully inserted position of the retainer 210 and the male component 14 shown in FIG. 23, the projections 230 and 232 on the side legs 214 and 216 of the retainer 210 extend through the apertures 149 and 151 in the housing 20 and snap over into engagement with the flats 146 formed exteriorly on the housing 20 to lock the retainer 210 to the housing 20 and to prevent movement of the male component 14 relative to the female component 12.

The male component 14 can be disengaged from the female component 12 only under user exerted force on the ends 222 of the side legs 214 and 216 urging the ends 222 of the side legs 214 and 216 toward each other a sufficient distance to disengage the projections 230 and 232 from the flats 146 on the housing 20. The retainer 210 can then be pushed partially through the housing 20 until the user can grasp the grip tabs 206 on the opposite end of the retainer 210 and remove the retainer 210 from the housing 20.

In summary, there has been disclosed a unique retainer for a quick connector which provides minimal axial movement of the male component when fully engaged in the female component, releasable locking of the male and female components of the quick connector together, as well as a visual indication of complete or incomplete coupling of the male and female components. The retainer has a simplified construction for a low manufacturing cost and ease of use. Further, the retainer provides both retaining and visible coupling indication features in a single element thereby reducing component count and the need for any special modification to conventional quick connector designs.

What is claimed is:

1. A quick connector comprising:

mating male and female components;

the male component having a first end portion terminating in a tip end and having a radially enlarged flange spaced from the tip end;

the female component including a housing having an axially extending stepped bore formed of first, second and third stepped bores respectively extending axially from an open end at one end of the housing for receiving the tip ends and the radially enlarged flange of the male component therein;

the third bore of the axially extending stepped bore supporting the tip end of the male component when the male component is fully inserted into the housing;

seal means, mounted in the second bore of the axially extending stepped bore and having first and second opposed ends, the second end disposed adjacent to the third bore of the axially extending stepped bore;

a pair of opposed, aligned apertures formed in the housing in transverse communication with the first bore of the axially extending bore;

retainer means, slidable through the pair of apertures in the housing, for releasibly locking the male and female components together, the retainer means including:

a body having an end wall and first and second spaced legs extending from the end wall and terminating in outer ends, each of the first and second legs having opposed first and second side edges;

male component engaging means formed on at least facing surfaces of the first and second side legs of the body; and radial flange engaging means formed on the male component engaging means and having a first edge spaced from the first side edge of the first and second side legs of the body, the first edge, spaced closer to the first side edge of the body than from the second side edge of the body;

the tip end of the male component extending through and spaced a first distance from the second end of the seal means when the male component is fully inserted into the axially extending stepped bore in the housing of the female component; and the radial flange engaging means including the first edge spaced a second distance from the second edge of the body of the retainer, the second distance being greater than or equal to the first distance.

2. A quick connector comprising:

mating male and female components;

the male component having a first end portion terminating in a tip end and having a radially enlarged flange spaced from the tip end;

the female component including a housing having an axially extending stepped bore formed of at least a first bore portion disposed adjacent to an open end at one end of the housing for receiving the male component therein;

a pair of opposed, aligned apertures formed in the housing in transverse communication with the first bore of the axially extending bore; and retainer means, slidable through the pair of apertures in the housing, for releasibly locking the male and female components together, the retainer means including:

a body having an end wall and first and second spaced legs extending from the end wall and terminating in outer ends, each of the first and second legs having opposed first and second side edges;

male component engaging means formed on at least facing surfaces of the first and second side legs of the body, the male component engaging means including:

a rib formed on facing surfaces of the first and second side legs; and first and second arms formed on the rib, the first and second arms spaced apart a distance less than an outer diameter of the male component, the first and second arms cantilevered from the first and second legs, respectively, to exhibit bending movement about the male component to permit sliding insertion of the retainer through the apertures in the housing and about the male component only when the male component is fully inserted into the housing; and radial flange engaging means formed on the male component engaging means and having a first edge spaced from the first side edge of the first and second side legs of the body, the first edge spaced closer to the first side edge of the body than from the second side edge of the body.

3. A quick connector comprising:

mating male and female components;

the male component having a first end portion terminating in a tip end and having a radially enlarged flange spaced from the tip end;

the female component including a housing having an axially extending stepped bore formed of at least a first bore portion disposed adjacent to an open end at one end of the housing for receiving the male component therein;

a pair of opposed, aligned apertures formed in the housing in transverse communication with the first bore of the axially extending bore;

retainer means, slidable through the pair of apertures in the housing, for releasibly locking the male and female components together, the retainer means including:

a body having an end wall and first and second spaced legs extending from the end wall and terminating in outer ends, each of the first and second legs having opposed first and second side edges;

male component engaging means formed on at least facing surfaces of the first and second side legs of the body; and radial flange engaging means formed on the male component engaging means and having a first edge spaced from the first side edge of the first and second side legs of the body, the first edge spaced closer to the first side edge of the body than from the second side edge of the body; and locking means, formed on one of the first and second side legs of the body of the retainer means, for releasibly locking the retainer means in at least one of a partially inserted position through the first and second apertures in the housing and a fully inserted position wherein the outer ends of the first and second legs extend through the pair of apertures and outward from the housing.

4. The quick connector of claim 3 wherein the housing comprises:

at least one groove extending axially from the open first end of the housing along the first bore portion of the axially extending bore.

5. The quick connector of claim 4 wherein the locking means comprises:

at least one projection formed on one of the first and second side edges of one of the first and second legs and releasibly engagable with the at least one groove in the housing to lock the retainer in a partially inserted position in the housing.

6. The quick connector of claim 5 wherein the locking means comprises:

a projection formed on each of the first and second side edges of each of the first and second legs of the body of the retainer.

7. The quick connector of claim 4 wherein the locking means comprises:

a projection formed on at least one of the first and second side legs of the body of the retainer and extending perpendicularly from an exterior surface of the one side leg to releasibly engage the at least one groove in the housing to lock the retainer in a partially inserted position in the housing.

8. The quick connector claim 3 further comprising:

two spaced, axially extending grooves formed in the housing and extending from the open first end of the housing along the first bore of the axially extending bore.

9. The quick connector of claim 8 wherein the locking means comprises:

a projection formed on each of the first and second side legs, each projection releasibly engagable with one of the grooves in the housing.

10. The quick connector of claim 3 further comprising:

at least one lock surface formed exteriorly on the housing of the female component, the at least one lock surface engaged by the locking means when the retainer is inserted through the pair of apertures in the housing.

11. The quick connector of claim 10 wherein the at least one lock surface comprises:

an axially extending flat formed exteriorly on the housing.

12. The quick connector of claim 10 further comprising:

a first pair of planarly aligned lock surfaces disposed on opposite sides of the housing.

13. The quick connector of claim 12 further comprising:

a second pair of planarly aligned lock surfaces disposed on opposite sides of the housing and spaced from the first pair of lock surfaces.

14. A quick connector comprising:

mating male and female components;

the male component having a first end portion terminating in a tip end and having a radially enlarged flange spaced from the tip end;

the female component including a housing having an axially extending stepped bore formed of at least a first bore portion disposed adjacent to an open end at one end of the housing for receiving the male component therein;

a pair of opposed, aligned apertures formed in the housing in transverse communication with the first bore of the axially extending bore; and retainer means, slidable through the pair of apertures in the housing, for releasibly locking the male and female components together, the retainer means including:

a body having an end wall and first and second spaced legs extending from the end wall and terminating in outer ends, each of the first and second legs having opposed first and second side edges;

male component engaging means formed on at least facing surfaces of the first and second side legs of the body; and radial flange engaging means formed on the male component engaging means and having a first edge spaced from the first side edge of the first and second side legs of the body, the first edge spaced closer to the first side edge of the body than from the second side edge of the body;

grip tabs formed adjacent the end wall of the body of the retainer means and projecting exteriorly from the first and second side legs of the body of the retainer means; and recesses formed in the housing adjacent the pair of apertures, the recesses receiving the grip tabs to limit the insertion distance of the body of the retainer into the housing.

15. A quick connector comprising:

mating male and female components;

the male component having a first end portion terminating in a tip end and having a radially enlarged flange spaced from the tip end;

the female component including a housing having an axially extending stepped bore formed of at least a first bore portion disposed adjacent to an open end at one end of the housing for receiving the male component therein, at least one groove extending axially from the open end of the housing along the first bore portion of the axially extending bore;

a pair of opposed, aligned apertures formed in the housing in transverse communication with the first bore of the axially extending bore;

retainer means, slidable through the pair of apertures in the housing, for releasibly locking the male and female components together, the retainer means including:

a body having an end wall and first and second spaced legs extending from the end wall and terminating an outer ends, each of the first and second legs having opposed first and second side edges;

male component engaging means formed on the first and second side legs of the body;

radial flange engaging means, formed on the male component engaging means, for enabling the body to slide over the radial flange on the male component and through the pair of apertures in the housing when the male component is fully inserted into the stepped bore in the female component; and locking means, formed on one of the first and second side legs of the body, for releasibly locking the body in at least one of a partially inserted position through the first and second apertures in engagement with the at least one groove in the housing and a fully inserted position wherein the outer ends of the first and second legs extend through the pair of apertures and outward from the housing.

16. The quick connector of claim 15 wherein the locking means comprises:

at least one projection formed on one of the first and second legs and releasibly engagable with the at least one groove in the housing to lock the body in a partially inserted position in the housing.

17. The quick connector of claim 15 wherein:

the at least one groove includes two spaced, axially extending grooves formed in the housing and extending from the open first end of the housing along the first bore of the axially extending bore.

18. The quick connector of 17 wherein the locking means comprises:

a projection formed on each of the first and second side legs, each projection releasibly engagable with one of the grooves in the housing.

19. The quick connector of claim 15 further comprising:

at least one lock surface formed exteriorly on the housing of the female component, the at least one lock surface engaged by the locking means when the body is inserted through the pair of apertures in the housing.

20. The quick connector of claim 19 wherein the at least one lock surface comprises:

an axially extending flat formed exteriorly on the housing.

21. The quick connector of claim 19 further comprising:

a first pair of planarly aligned lock surfaces disposed on opposite sides of the housing.

22. A quick connector comprising:

mating male and female components;

the male component having a first end portion terminating in a tip end and having a radially enlarged flange spaced from the tip end;

the female component including a housing having an axially extending stepped bore formed of at least a first bore portion disposed adjacent to an open end at one end of the housing for receiving the male component therein;

a pair of opposed, aligned apertures formed in the housing in transverse communication with the first bore of the axially extending bore;

retainer means, slidable through the pair of apertures in the housing, for releasibly locking the male and female components together, the retainer means including:

a body having an end wall and first and second spaced legs extending from the end wall and terminating an outer ends, each of the first and second legs having opposed first and second side edges;

male component engaging means formed on the first and second side legs of the body;

radial flange engaging means, formed on the male component engaging means, for enabling the body to slide over the radial flange on the male component and through the pair of apertures in the housing when the male component is fully inserted into the stepped bore in the female component; and locking means, formed on one of the first and second side legs of the body, for releasibly locking the body in at least one of a partially inserted position through the first and second apertures in the housing and a fully inserted position wherein the outer ends of the first and second legs extend through the pair of apertures and outward from the housing;

a first pair of planarly aligned lock surfaces disposed on opposite exterior sides of the housing;

a second pair of planarly aligned lock surfaces disposed on opposite exterior sides of the housing and spaced from the first pair of lock surfaces; and one of the first and second pairs of lock surfaces engaged by the locking means when the body is inserted through the pair of apertures in the housing.

23. The quick connector of claim 15 further comprising:

grip tabs formed adjacent the end wall of the body and projecting exteriorly from the first and second side legs of the body; and recesses formed in the housing adjacent the pair of apertures, the recesses receiving the grip tabs to limit the insertion distance of the body into the housing.

24. A quick connector comprising:

mating male and female components;

the female component including a housing having an axially extending bore terminating at an open end of the housing for receiving the male component therein, at least one groove extending axially from the open first end of the housing along the first bore portion of the axially extending bore;

a pair of opposed apertures formed in the housing and forming a transverse bore in the housing disposed in communication with the axially extending bore;

the male component having a radially enlarged flange spaced from one end;

retainer means, slidable through the pair of opposed apertures in the housing for releasably locking the male and female components together;

the retainer means including:

a body having an end wall and first and second spaced legs extending from the end wall;

an aperture formed between the first and second legs;

radial flange engagement means, formed on the body, for engaging the radial flange on the male component after the male component is coupled in the female component to prevent separation of the male component and the female component; and means for releasably locking the body in a partially inserted position in at least one of the apertures in the housing and in engagement with the at least one groove with the first and second legs positioned to enable insertion of the male component into the female component.

25. The quick connector of claim 24 wherein the housing comprises:

at least one groove extending axially from the open first end of the housing along the first bore portion of the axially extending bore.

26. The quick connector of claim 24 wherein the locking means comprises:

at least one projection formed on one of the first and second side edges of one of the first and second legs and releasibly engagable with the at least one groove in the housing to lock the retainer in a partially inserted position in the housing.

27. The quick connector of claim 26 wherein the locking means comprises:

a projection formed on the side edge of each of the first and second legs of the body of the retainer.

28. The quick connector of claim 24 wherein the locking means comprises:

a projection formed on at least one of the first and second side legs of the body of the retainer and extending perpendicularly from an exterior surface of the one side leg to releasibly engage the at least one groove in the housing to lock the retainer in a partially inserted position in the housing.

29. The quick connector of claim 24 wherein:

the at least one groove includes two spaced, axially extending grooves formed in the housing and extending from the open first end of the housing along the first bore of the axially extending bore.

30. The quick connector of claim 29 Wherein the locking means comprises:

a projection formed on each of the first and second side legs, each projection releasibly engagable with one of the grooves in the housing.

31. The quick connector of claim 24 further comprising:

at least one lock surface formed exteriorly on the housing of the female component, the at least one lock surface engaged by the locking means when the retainer is inserted through the pair of apertures in the housing.

32. The quick connector of claim 31 wherein the at least one lock surface comprises:

an axially extending flat formed exteriorly on the housing.

33. The quick connector of claim 31 further comprising:

a first pair of planarly aligned lock surfaces disposed on opposite sides of the housing.

34. A quick connector comprising:

mating male and female components;

the female component including a housing having an axially extending bore terminating at an open end of the housing for receiving the male component therein;

a pair of opposed apertures formed in the housing and forming a transverse bore in the housing disposed in communication with the axially extending bore;

the male component having a radially enlarged flange spaced from one end;

retainer means, slidable through the transverse bore in the housing for releasibly locking the male and female components together;

the retainer means including:

a body having an end wall and first and second spaced legs extending from the end wall;

the first and second legs defining an aperture therebetween;

radial flange engagement means, formed on the body, for engaging the radial flange on the male component after the male component is coupled in the female component to prevent separation of the male component and the female component; and means for releasibly locking the body in a partially inserted position in at least one of the apertures in the housing with the first and second legs positioned to enable insertion of the male component into the female component;

a first pair of planarly aligned lock surfaces disposed on opposite exterior sides of the housing; and a second pair of planarly aligned lock surfaces disposed on opposite exterior sides of the housing and spaced from the first pair of lock surfaces;

one of the first and second pairs of lock surfaces engaged by the locking means when the retainer is inserted through the pair of apertures in the housing.

* * * * *